United States Patent [19]
Dauerer et al.

[11] Patent Number: 6,021,416
[45] Date of Patent: Feb. 1, 2000

[54] DYNAMIC SOURCE CODE CAPTURE FOR A SELECTED REGION OF A DISPLAY

[75] Inventors: Norman J. Dauerer, Hopewell Junction; Edward E. Kelley, Wappingers Falls, both of N.Y.

[73] Assignee: International Business Machines Corporation, Armonk, N.Y.

[21] Appl. No.: 08/978,016

[22] Filed: Nov. 25, 1997

[51] Int. Cl.[7] .................................................. G06F 17/00
[52] U.S. Cl. .............................. 707/501; 707/4; 707/200
[58] Field of Search .................................... 345/186–526; 707/1–540

[56] References Cited

U.S. PATENT DOCUMENTS

| | | | |
|---|---|---|---|
| 5,659,729 | 8/1997 | Nielsen | 707/3 |
| 5,689,585 | 11/1997 | Bloomberg et al. | 382/229 |
| 5,845,303 | 12/1998 | Templeman | 707/517 |
| 5,860,073 | 1/1999 | Ferrel et al. | 707/522 |
| 5,897,670 | 4/1999 | Nielsen | 345/334 |

*Primary Examiner*—Thomas G. Black
*Assistant Examiner*—David Yiuk Jung
*Attorney, Agent, or Firm*—Ratner & Prestia; Aziz M. Ahsan

[57] ABSTRACT

A method and system are provided for processing a hypertext markup language (HTML) source file stored in a server processor. The processing is performed by a browser program in a client processor. The server processor and client may communicate with each other across a communications network, which may be the Internet. The HTML source file may define a web page in the worldwide web. The browser, in the client processor, processes the source file to generate an output display. A region within the output display is selected using a pointing device, such as a mouse, track ball, or the like. The region includes less than the whole output display. The region includes information, which may include text, a list, a table, or a graphic. Information that is displayed within the region is identified by the client processor. The client processor identifies a portion of the source file from which the information displayed within the region is generated. The portion is less than the whole source file. The identification includes a search for matching text in the region and in the portion of the source file. The HTML tags in the source file are examined to determine whether they are the appropriate tags to generate the information in the region. The identified portion of the source file is output by the client processor.

17 Claims, 10 Drawing Sheets

DYNAMIC SOURCE CODE CAPTURE FOR A SELECTED REGION OF A DISPLAY

FIELD OF THE INVENTION

The present invention relates generally to Internet technology and, more particularly, to browser tools suitable for viewing text and graphics on the Internet.

BACKGROUND OF THE INVENTION

The "Internet" is the world's largest computer network. A network consists of two or more computers linked together to share resources. The Internet is actually a network of thousands of independent networks, containing several million "host" computers that provide information services. The word "Internet" was originally coined by William Gibson, in his science fiction novel titled "Nueromancer," to describe the realm and cultural dynamics of people and machines working within the confines of computer-based networks.

In recent years, the development of the world-wide web (WWW) has dramatically increased the number of Internet users. The world-wide web is a hypertext-based information service that makes collections of information available across the Internet. It allows web browser clients to access information from any accessible web server, in which connections from one server to the next are handled entirely as background operations-transparent to the user. The world-wide web supports multiple media types and can be used to invoke other software. The primary user interface is represented by embedded hypertext links rather than by menus. Thus, the world-wide web is a subset of the Internet which are connected to each other through links known as "hypertext links."

Information stored in world-wide web sites may be displayed in "web pages." A web page is a computer data file on a host operating a web server within a given domain name. The web page may comprise a single line or multiple pages of information and may include any message, name, word, sound, picture, or combination of these elements.

Web pages are created using a standard coding language called, "hypertext markup language" (HTML). HTML is a collection of platform-independent styles, or tags, which define the various components of the web page. HTML codes define the look of each web page and provide links to other web sites.

Users commonly view web pages using tools known as "browsers," which are software programs that allow users to access and search the Internet. Browsers may be graphical (such as Netscape Corporation's Navigator™ or Microsoft Corporation's Internet Explorer™) or text based (such as Gopher). In a browser, information is displayed along with hypertext links which identify other world-wide web sites.

Typically, a user first accesses a web site using a known identification called the Uniform Resource Locator (URL) for the site. Once the first web page (or "home page") is displayed, the user can access additional web sites using hypertext links, without requiring knowledge of the URL identification for each of the additional web sites. A hypertext link is a link from one site on the Internet to a second site on the Internet. These are usually designated by highlighted text or a picture or some other indicator. By clicking on a hyperlink, users can seamlessly go from computer to computer (or between two locations on the same web page) without having to enter the host computer's URL. When the user selects one of the hypertext links with a pointing device, the browser accesses the web site associated with that hypertext link.

HTML documents are plain ASCII text files that may be created or edited using a text editor or word processor. Although HTML generating programs are commercially available, it is still common for a programmer to copy and edit a previously created HTML file using a plain text editor or word processor, in order to create a duplicate or near-duplicate of an existing web page.

As browsers have become more sophisticated, it is now relatively simple to display information from a plurality of sources in a single display. The display may include text, lists, tables, graphics, or a combination of these elements. In addition, the display may include multiple frames. A frame divides the screen into separate windows when an HTML source file is formatted and viewed by a browser. The divisions between frames may be difficult to detect. For example, a "frame web page" may include a frame (created by the owner of the web site) which surrounds a display generated by the web site of an unrelated party. Because a display may be generated from several different sources, it is difficult to determine how a particular region within a display is created. Thus, it may be difficult to find and copy a portion of an HTML file that generates a desired subset of the display.

Conventional web browsers provide a tool to view the source HTML documents. This is a valuable capability of a web browser that enables programmers to see how web documents are constructed in order to build similar documents. Nevertheless, the inventor of the present invention has recognized a drawback of these conventional tools. Conventional tools require that the user view and examine the entire document(s), the Java code, or both components which generate the web page. The conventional tools are of limited use to a programmer who wants to find the HTML or Java code which generates a small region within a large display. There remains a need, therefore, for an improved browser tool and method suitable for viewing text and graphics on the Internet.

SUMMARY OF THE INVENTION

To meet this and other needs, and in view of its purposes, the present invention provides a method and system for processing a source file. The source file is processed to generate an output display. A region within the output display is selected. The region includes less than the whole output display. Information that is displayed within the region is identified. A portion of the source file is identified from which the information displayed within the region is generated. The portion is less than the whole source file. Finally, the portion of the source file is output.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
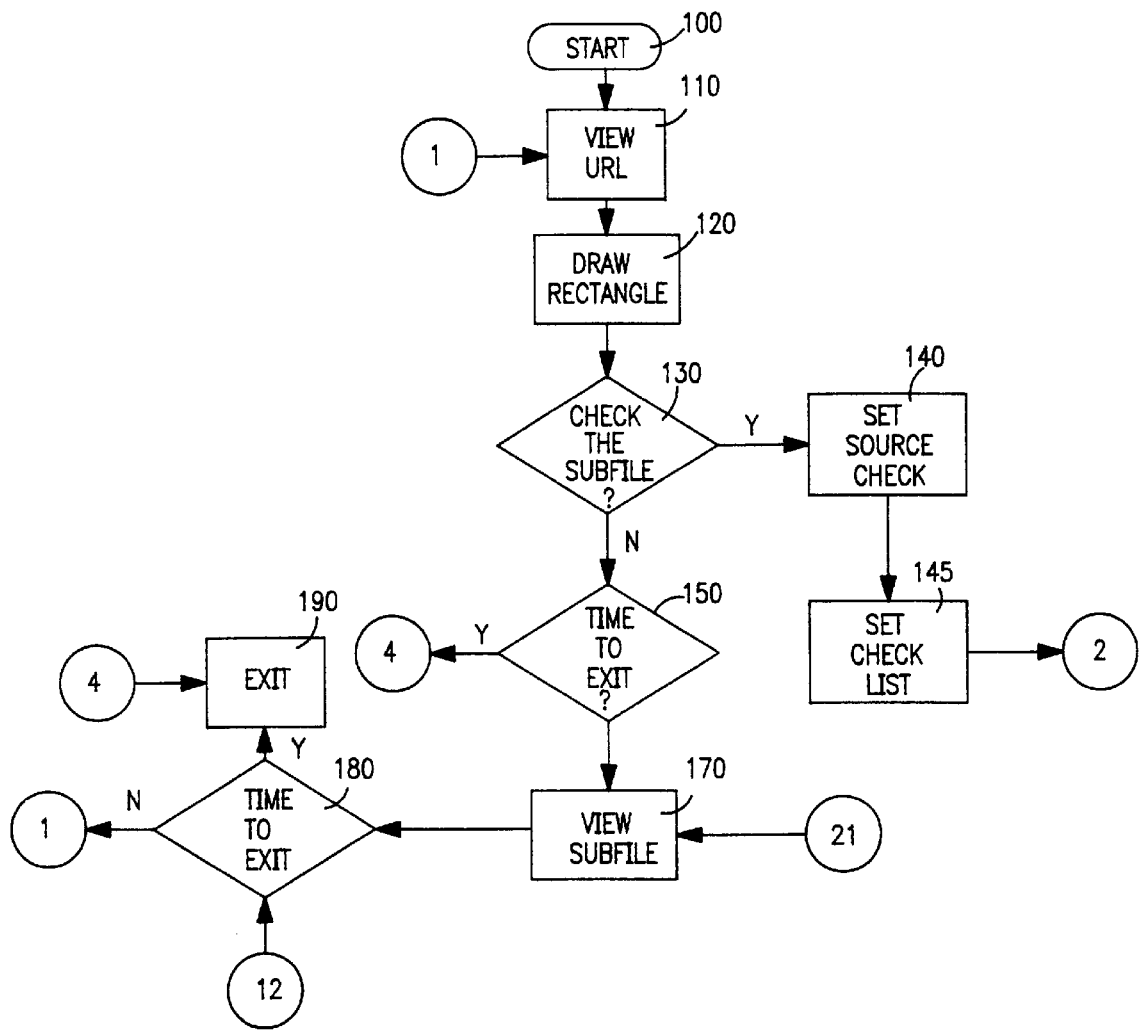
FIG. 1 is a top level flow chart diagram of a method according to the invention.

The following definitions are used in the detailed description of the invention which follows:

GLOSSARY

Frame: A frame is a process used to divide the browser screen into multiple windows, each window being generated by a respective HTML source file.

Frame Check: The frame check is a process for checking the frame instructions for the code that generates the frames included within the selected region.

Graphics Type: The graphics type is the HTML source file code, Javascript code, Java code, or other software program that produces graphics when viewed using a browser.

HTML Source Code: The HTML code is used to generate a display by selecting an item named "document source." This code is the first of a hierarchy of files that is used to build the output display generated by a browser.

HTML Source File: This is a file with HTML tags to be converted by a web browser and to be displayed on a display device.

Java: Java is a language that can be referenced in an HTML file, transmitted to a client, and processed by a browser to build an output display.

Java Check: The Java check is a process for checking Java instructions to search for the code that generates the output within a selected region of the display.

Javascript: Javascript is a language that can be placed in an HTML file and is processed by the browser to build an output display.

Javascript Check: The Javascript check is a process for checking Javascript instructions to search for the code that produces the output within a selected region of the display.

List Type: The list type is the HTML source file code, Javascript code, Java code, or other software code that produces formatted lists when viewed using a browser.

Lists: The lists are the output of list type after it is formatted.

Other Language: This term refers to any programming language (other than HTML, Javascript, or Java) containing code which is processed to generate the output within a selected region of the display.

Other Language Check: This term refers to a process for checking code in "other languages" (other than HTML, Javascript, or Java) for the code that produces the output within a selected region of the display.

Other Language Source: This is code, other than HTML, Javascript, or Java code, that is referenced by a browser in an HTML source file and is sent to the browser, to be executed by the client, when the HTML source file that contains the "other language" source reference is executed by the web browser.

Primary Frame Source: This is the code that is processed in a typical web browser. Frame code usually points to a hypertext transport protocol (HTTP) address that contains the detail frame code used to produce what is to be found in the selected region.

Primary HTML Source: This is the HTML source file that is normally viewed in most browsers by selecting an item named "document source." This is the first of a hierarchy of files that is used to build the output screen viewed by a browser.

Primary Javascript Source: This is code that is usually included in the main HTML source file and is executed by the client when the HTML source file is viewed by the typical web browser.

Primary Java Source: This is code that is referenced by a browser in an HTML source file and is sent to the browser, to be executed by the client, when the HTML source file that contains the Java source reference is executed by the typical web browser.

Region: This is a geometric figure (preferably a rectangle) drawn around a portion of a screen viewed by a browser for which the user wishes to find the code that generated that portion of the screen.

Source Check: This is a check for the code that produces the section of the screen defined by the selected region. The HTML source file, which is the first in a potential hierarchy of files that produce the browser screen output, is checked. This source file is generally found by selecting the "view source" option found in most browsers.

Source Text Type: This is the source code that is either list type, tables type, or text type.

Subfile: This is the output file of the program. It is a new HTML file that contains the HTML code and/or other code (plus explanations for missing code, if any) that is used to generate the portion of the file viewed by the web browser that is within the region selected by the user.

Tables: This is the output of tables type after it is formatted.

Tables Type: This is the HTML source file code or Javascript code or Java code that produces tables when viewed from a browser or any software code that produces tables when viewed from a browser.

Text: This is the output of text type after it has been formatted.

Text Type: This is the HTML source file code or Javascript code or Java code that produces text when viewed from a browser or any software code that produces text when viewed from a browser.

OVERVIEW

The exemplary embodiment of the present invention is a method and system for processing an HTML source file. The source file is processed by a browser program to generate an output display. A region within the output display is selected. Preferably, the region is a rectangle. The region includes less than the whole output display. Information that is displayed within the region is identified. The information may include text, a list, a table, or a graphic. A portion of the source file is identified from which the information displayed within the region is generated. The portion is less than the whole source file. The portion of the source file may include HTML tags.

If the selected region includes text, then a search is performed for any text within the source file which matches the text within the region. Once identified, the portion of the source file is output.

If the selected region includes a list, then a search is performed for any text within the source file which matches the text within the region. If a subset of the text within the source file matches the text within the region, the HTML tags in the source file which are associated with the text in the subset are searched for HTML tags for defining a list. If both matching text and the tags for the list are found, the portion of the source file which generates the list in the region is identified.

Similarly, if the selected region includes a table, then the a search is first performed for matching text. If a subset of the text within the source file matches the text within the region, the HTML tags in the source file which are associated with the text in the subset are searched for HTML tags for defining a table. If both matching text and the tags for the table are found, the portion of the source file which generates the table in the region is identified. Once identified, the portion of the source file is output.

According to another aspect of the present invention, the source file may contain source or object code of a software program. The source code may be, for example, Javascript within the source file. The step of identifying the portion of the source file includes determining the output of the software program. If the output of the software program matches the information displayed within the region, the source or object code of the software program is identified as the portion of the source file.

According to still another aspect of the present invention, a method and system are provided for processing an HTML source file stored in a fileserver. The processing is performed by a browser program in a client processor. The fileserver and client processor may communicate with each other across a communications network, which may be the Internet. The HTML source file may define a web page in the worldwide web. The browser, in the client processor, processes the source file to generate an output display. A region within the output display is selected using a pointing device, such as a mouse, track ball, or the like. The region includes less than the whole output display. Information that is displayed within the region is identified by the client processor. The client processor identifies a portion of the source file from which the information displayed within the region is generated. The portion is less than the whole source file. The portion of the source file is output by the client processor.

The source file may include code which references a further file containing source or object code of a software program. The further file contains Java code. The further file is transmitted by the fileserver to the client processor. The browser in the client processor executes the source or object code to generate an output display. In this case, the client processor determines the output of the software program and determines whether the output of the software program matches the information displayed within the region. The source or object code of the software program is listed if the output of the software program matches the information displayed within the region.

Alternatively, the fileserver includes a language library, and the source file may include source code written in a language other than Java. In this case, the client processor may access the language library routines in the fileserver to enable the client processor to process the source file so that the client processor can determine the output of the software program.

These and other aspects of the invention are described below with reference to the figures and to the detailed description of the preferred embodiments of the present invention.

DETAILED DESCRIPTION OF THE PREFERRED EMBODIMENTS

FIG. 1 is a top level flow chart diagram of a method according to the invention. At step 100, the process starts. At step 110, the user accesses a web page by entering the URL, for example, or by selecting a hypertext link associated with the web page. The web page is displayed on a display device.

At step 120, a region is selected. While viewing the display in the web browser, the user defines the region with an input device to determine which portion of the source code produced the portion of the displayed information lying within the region. In the preferred embodiment, the input device is a pointing device, such as a mouse, track ball, or the like. The coordinates of the region may be defined by locations within the display in which the pointing device is clicked and released. Alternatively, a keyboard may be used to enter numerical coordinates for the region. Preferably, the region is a rectangle, because use of a rectangle minimizes the computational complexity of the program. Other region shapes, such as a non-rectangular polygon or a circle, may be used, but they require more complex computations and are likely to result in slower execution time for the process.

At step 130, the user decides whether to check the source code to identify what code produced the output in the region. For example, a dialog box may be presented to the user to determine whether to perform the source check. If the source code identification is desired, then control is transferred to step 140. If source code identification is not desired, then control is transferred to step 150.

At step 140, in response to the selection by the user of a region for processing, a switch is set to begin the source code check. The source code check is performed in step 145 and the steps shown in FIGS. 2 and 3, which are described in detail below. Upon successful completion of the source code check, control is transferred to step 170 of FIG. 1.

At step 170, the portion of source code which generates the information displayed in the selected region is available in a file referred to herein as "the subfile." The user can view the subfile to review the HTML code and other code that is used to generate the information displayed in the selected region of the display. Also, the user is able to view any special messages that may have been recorded during the processing of the selected region.

At step 150, if the user chooses to exit the program, execution of the process for determining the source code which generated the selected region of the web browser screen terminates at step 190.

At step 180, the user is prompted (for example, via a dialog box) either to end the program or to select another URL or another region within the current web page being displayed. If the user chooses to select another URL or another region, control is transferred to step 110. If the user chooses not to select another URL or region, control is transferred to step 190, and the program is terminated.

Referring again to step 145, the process for determining the source code which generates the selected region is started. At step 145, a check list switch is set. The check list switch is set to begin searching the source file for list type HTML source code, i.e., HTML source file code, Javascript code, Java code, or other software code that produces formatted lists. Then, the steps of FIGS. 2 and 3 are executed.

Figure 2:
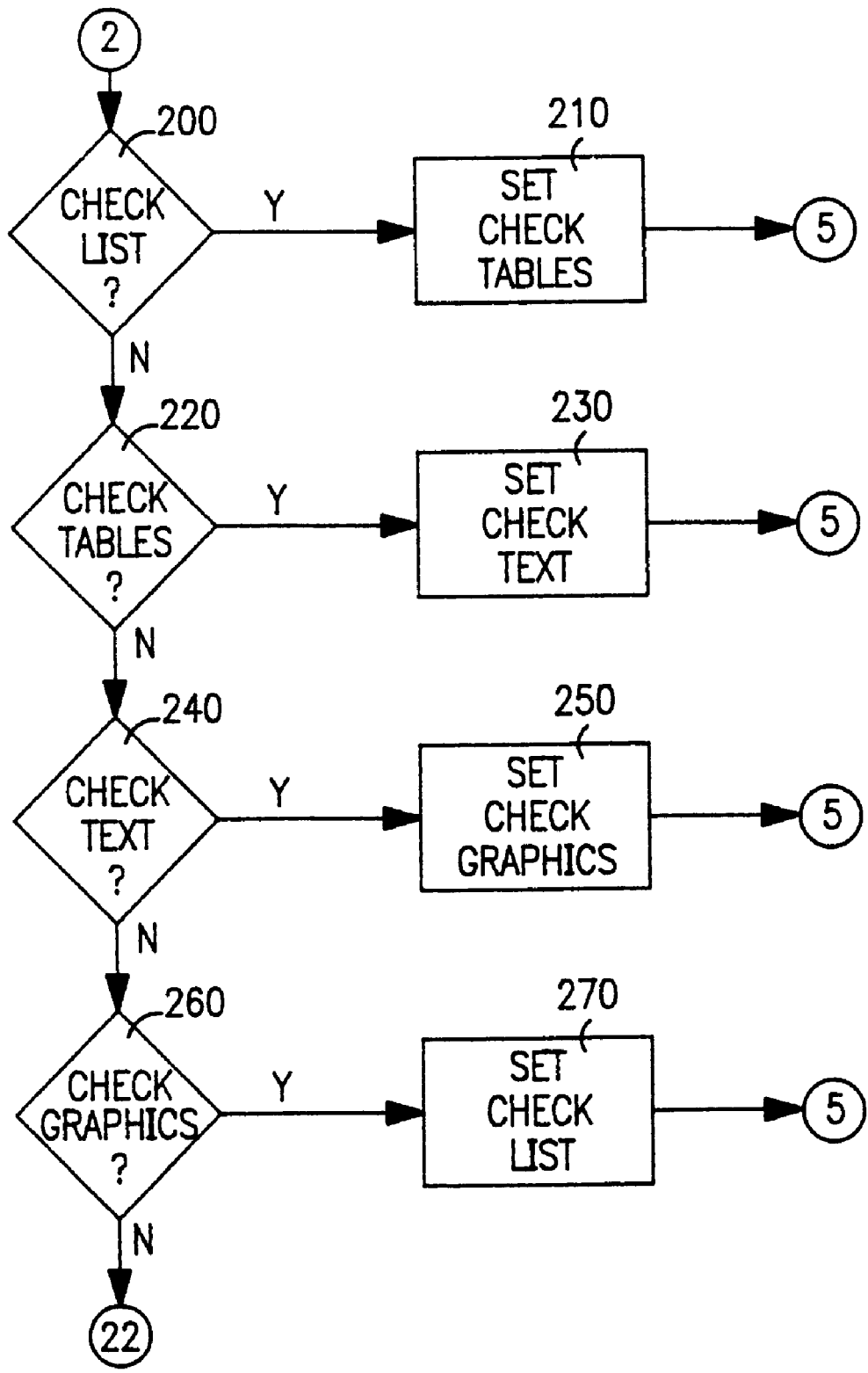
FIG. 2 is a flow chart diagram showing the sequence of checks which are performed for different types of text and graphical formats.
Figure 3:
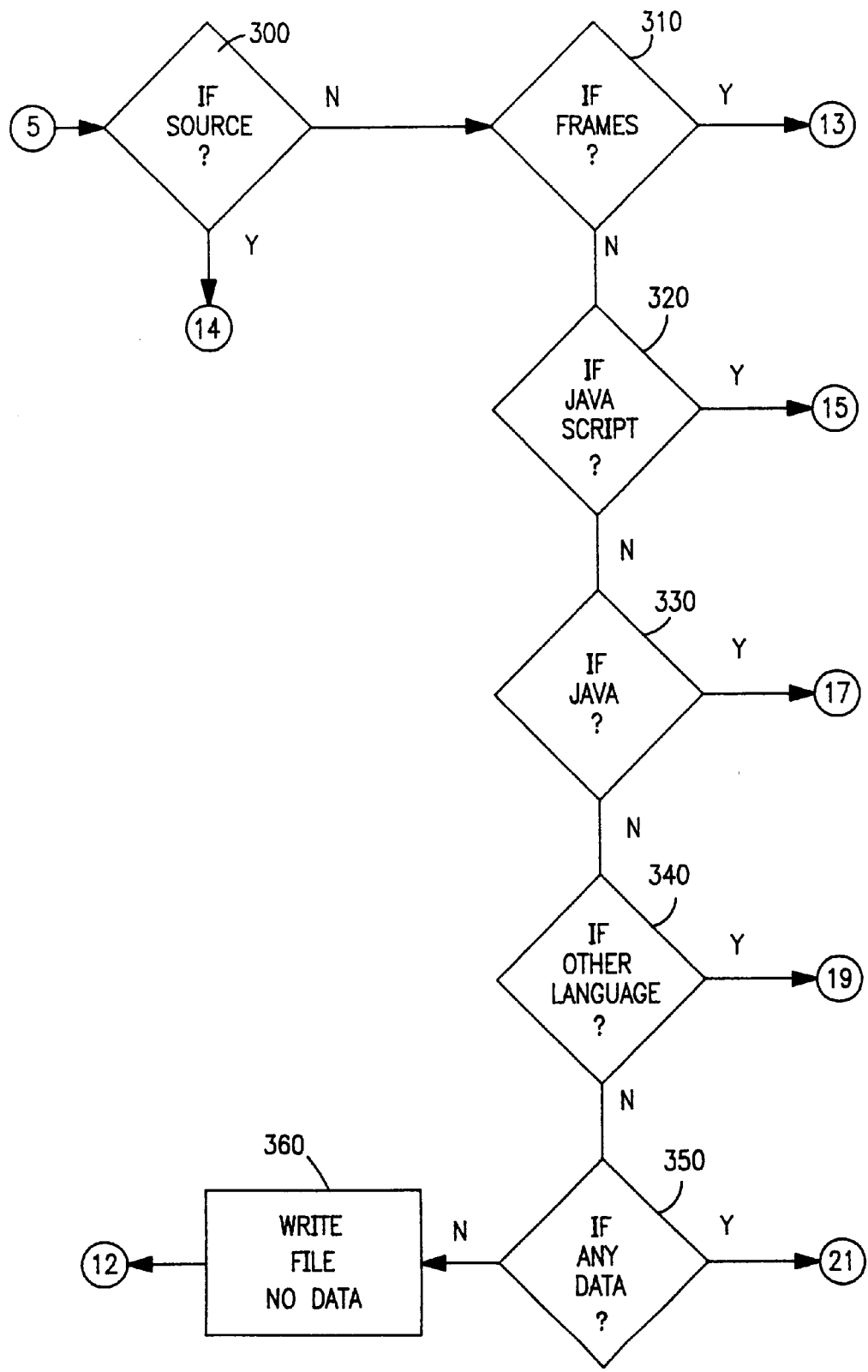
FIG. 3 is a flow chart diagram of the process for performing the search for the desired code that generates the selected region of the display.

FIG. 2 is a flow chart diagram showing the sequence of checks which are performed for different types of text and graphical formats. For each type (list check, table check, text check, and graphics check), a switch is set when the search is performed for that type. The switch may be implemented as a logical flag, or as a counter, or as a variable which has a respectively different value for each type of check performed. In any event, once the switch is set for a specific type of format, that check is not repeated for the same type (until the first switch is reset at step 270); the next time the main loop of FIG. 2 is repeated, the next information type is checked. With each successive pass through the steps of FIG. 2, a respectively different check (i.e., list check, table check, text check, and graphics check) is performed.

At step 200, having already set the check list switch at step 145, the program checks the switch values to determine whether to check for list type code during the current pass through the steps of FIG. 2. The first time step 200 is executed, the result of the decision block is "YES," and control is passed to step 210. On all subsequent iterations of step 200, the result is "No," and control is passed to step 220.

At step 210, the switch for table type source code is set, to check for table type code in the following iteration, and control is passed to the process of FIG. 3 to perform the search for list type code. At step 220, the program determines whether this is the iteration in which to check for table type source code (i.e., HTML source file code, Javascript code, Java code, or other software code that produces text when viewed from a browser). The first time step 220 is executed, control is passed to step 230. On all subsequent iterations of step 220, the result is "No," and control is passed to step 240.

At step 230, the switch for text type source code is set, to check for text type code in the following iteration, and control is passed to the process of FIG. 3 to perform the search for table type code. At step 240, the program determines whether this is the iteration in which to check for text. The first time step 240 is executed, control is passed to step 250. On all subsequent iterations of step 240, the result is "No," and control is passed to step 260.

At step 250, the switch for graphics type source code (i.e., HTML source file code, Javascript code, Java code, or other software program that produces graphics when viewed using a browser) is set to check for text type code in the following iteration. Then, control is passed to the process of FIG. 3 to perform the search for text.

At step 260, the program determines whether this is the iteration in which to check for graphics type code. The first time step 260 is executed, control is passed to step 270. On all subsequent iterations of step 260, the result is "No," and control is passed to step 600 (shown in FIG. 6). At step 270, the switch for checking for list type code is again reset, so that control is passed to step 600 (FIG. 6) in a subsequent iteration through step 260. The next time control is passed to step 200, the sequence of list check, table check, text check, and graphics check is repeated.

FIG. 3 is a flow chart diagram of the process for performing the search for the desired portion of the source file that generates the selected region of the display. In the exemplary embodiment, and in particular, in the steps of FIG. 3, several matching tests are performed to determine whether a string within the selected region matches a string (or a portion of a string) within the primary HTML source file (or a further file referenced by the primary HTML source file.) These steps use known string matching techniques for determining: (1) whether a query string matches a target string stored in a stored file; and (2) whether a query string matches a portion of a target string stored in a file. These string matching techniques are well known to one of ordinary skill in the art of computer programming, and are not described in detail herein.

Figure 4A:
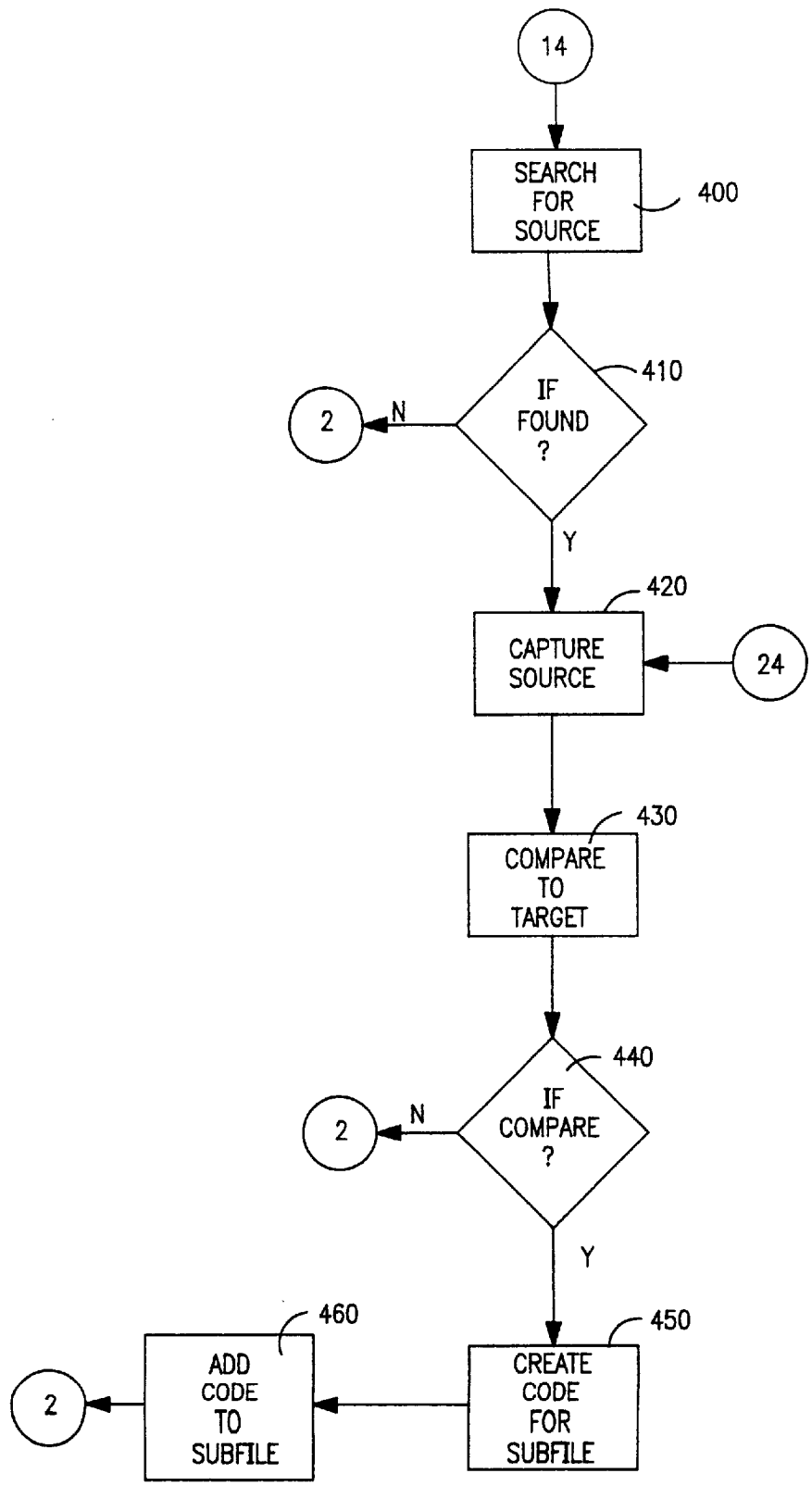
FIG. 4A is a flow chart diagram of the process for searching in the HTML source file for code that generates the selected region of the display.

At step 300, the program determines whether to perform a source check during the current iteration of the steps of FIG. 3. The source check is a search for the code that generates the portion of the display defined by the region. If the result of the determination in step 300 is "Yes," control is transferred to step 400 (FIG. 4A). If the result of the determination in step 300 is "No," control is transferred to step 310.

Figure 5:
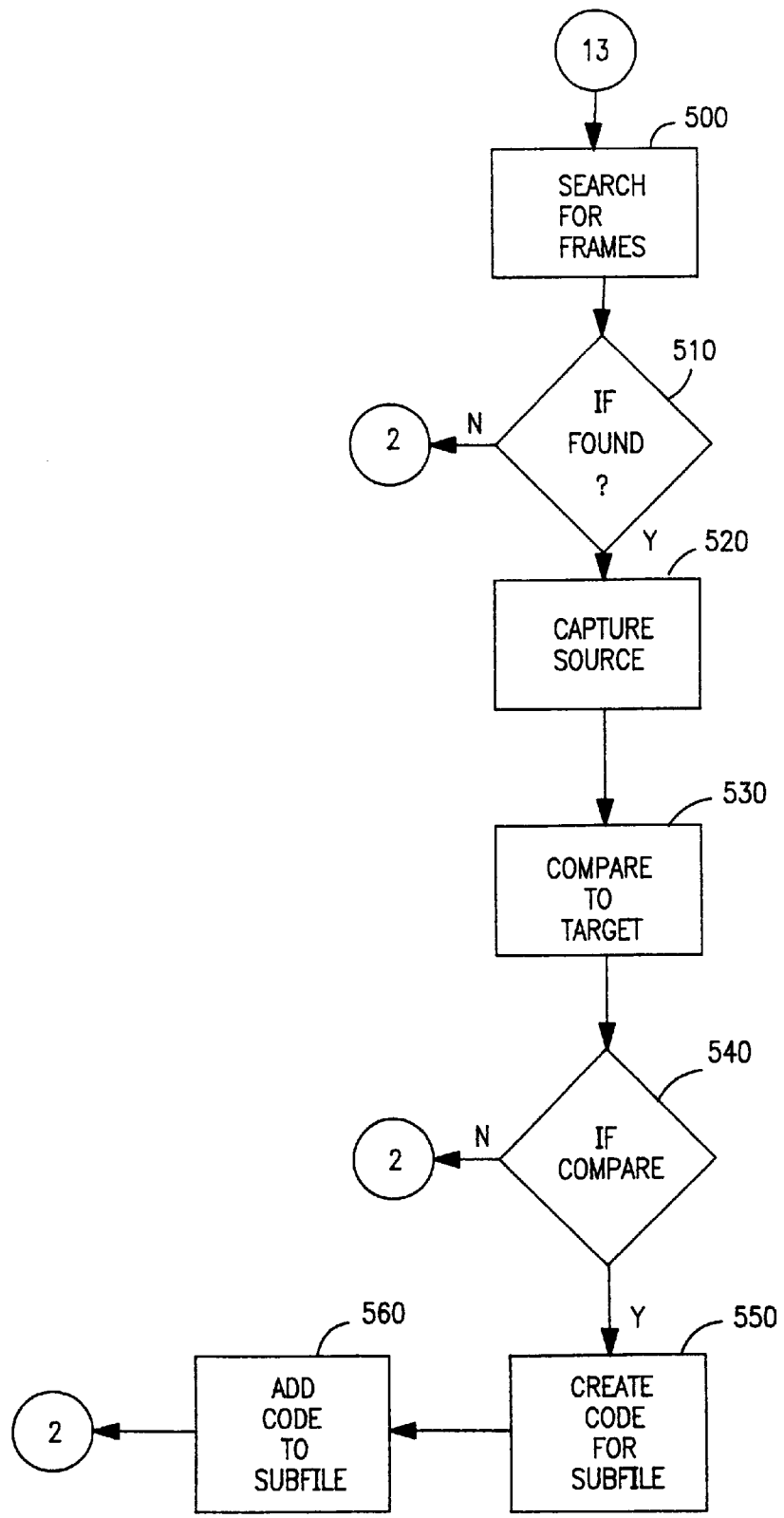
FIG. 5 is a flow chart diagram of the process for searching the frame data in the HTML source file and referenced files.

At step 310, the program determines whether to perform a frame check during the current iteration of the steps of FIG. 3. The frame check is a search for the frame code that generates the frames defined in the region. If the result is "Yes," then control is transferred to step 500 (FIG. 5). If the result of the determination in step 310 is "No," then control is transferred to step 320.

Figure 7:
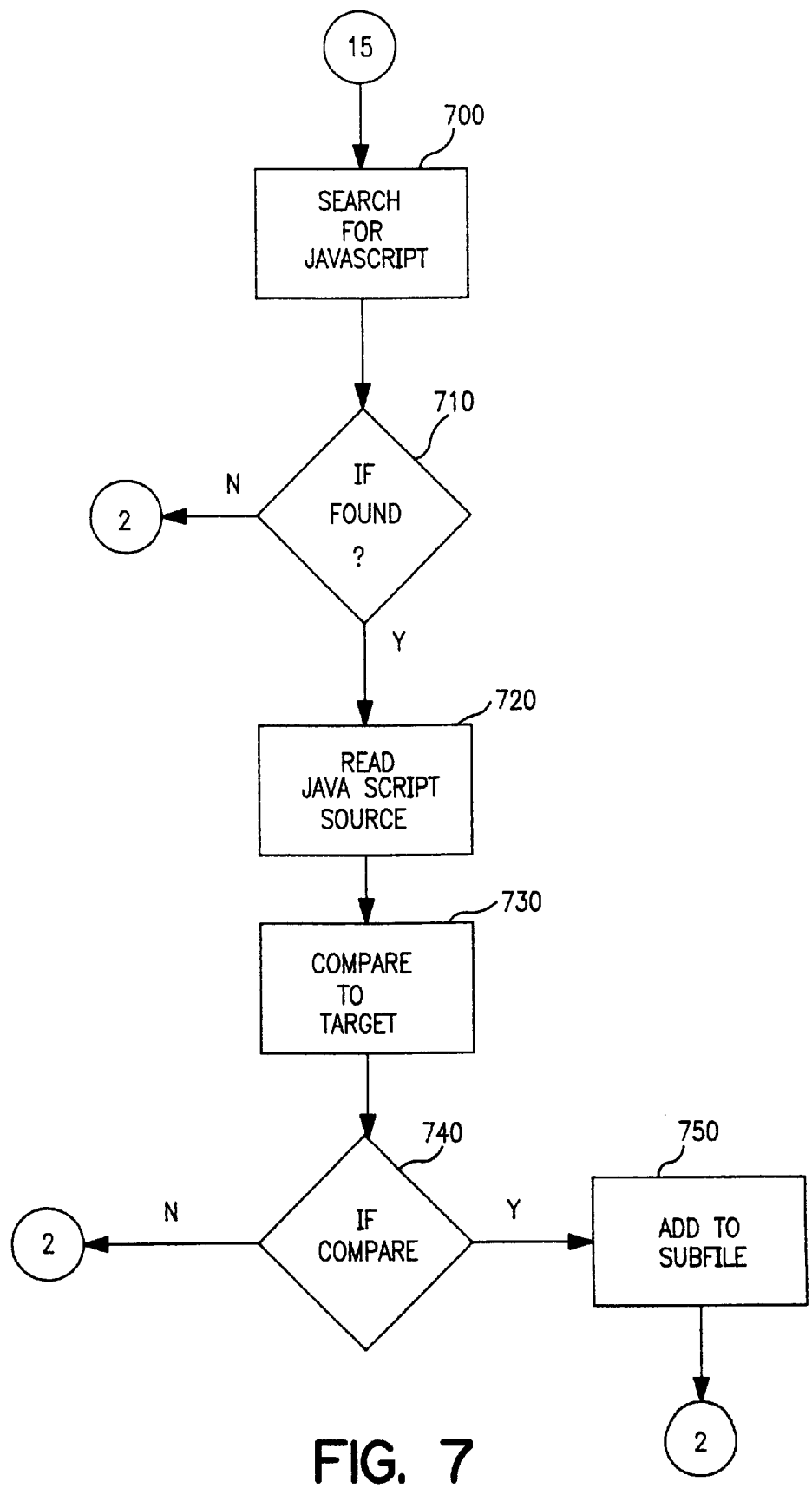
FIG. 7 is a flow chart diagram of the process for searching the source file for Javascript source code.

At step 320, the program determines whether to perform a Javascript check during the current iteration of the steps of FIG. 3. The Javascript check is a search for the Javascript code within the source file that generates the information defined in the region. If the result is "Yes," then control is transferred to step 700 (FIG. 7). If the result of the determination in step 320 is "No," then control is transferred to step 330.

Figure 8:
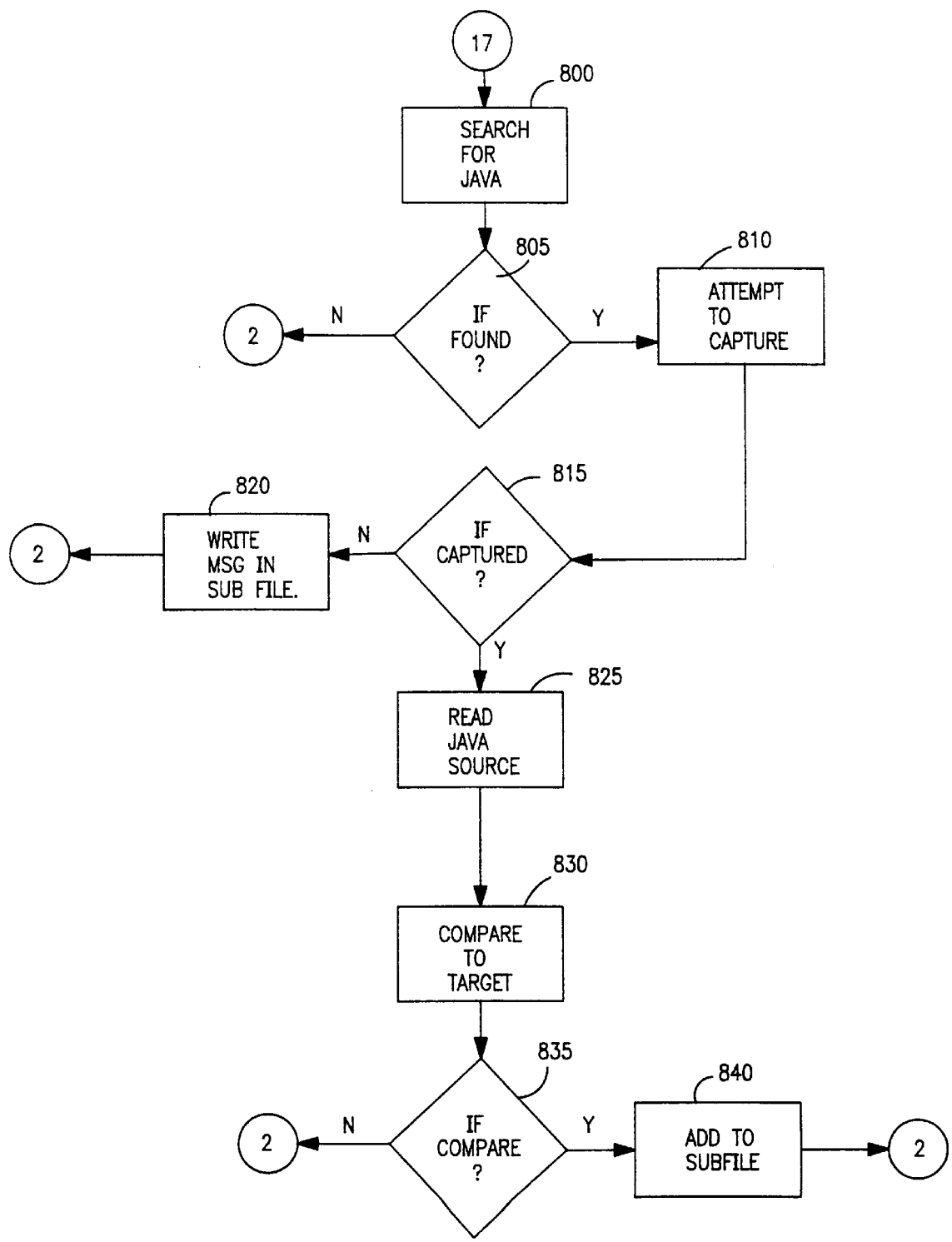
FIG. 8 is a flow chart diagram of the process for searching files in the fileserver (other than the primary source file that generates the web page) for Java source code.

At step 330, the program determines whether to perform a Java check during the current iteration of the steps of FIG. 3. The Java check is a search among other files in the fileserver for Java code that generates the information defined in the region. If the result is "Yes," then control is transferred to step 800 (FIG. 8). If the result of the determination in step 330 is "No," then control is transferred to step 340.

Figure 9:
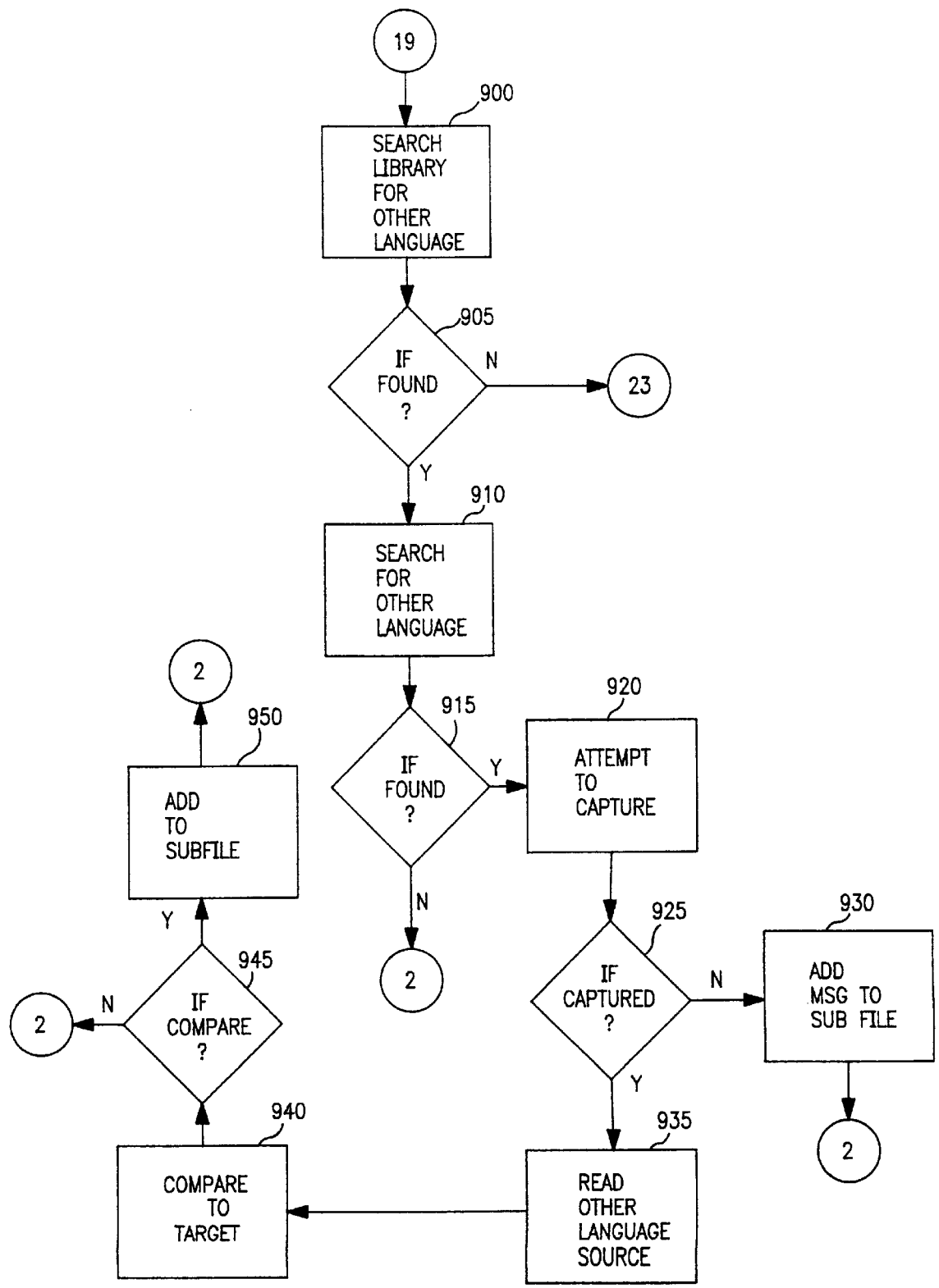
FIG. 9 is a flow chart diagram of the process for searching a language library in the fileserver for language routines that are used to decode the source code which generates the selected region of the display.

At step 340, the program determines whether to perform an "other language check" during the current iteration of the steps of FIG. 3. The "other language" check is a search among other library routines in the fileserver for routines in another language that are used to generate the information defined in the region. If the result is "Yes," then control is transferred to step 900 (FIG. 9). If the result of the determination in step 340 is "No," then control is transferred to step 350.

At step 350, if any of the searches launched from the steps in FIG. 3 found data matching the data in the region, control is transferred to step 170 (shown in FIG. 1), to allow the user to view the subfile containing the portion of the code that generates the region. If none of the searches found matching data, then control is transferred to step 360.

At step 360, a file or message is output, indicating that no matching data were found that generated the information contained within the region. Then control is transferred to step 180 in FIG. 1, to allow the user to end the program or to select another URL or another region within the current web page being displayed.

FIG. 4A is a flow chart diagram of the "source check" process for searching in the primary HTML source file for code that generates the selected region of the display. Steps 400 and 410 are the main blocks for source code search within the primary HTML source file. The process reads all of the data that are contained in the region and performs a systematic search of the primary HTML source file. Depending on the source text type, the step 400 performs a corresponding type of search of the data found in the region.

At step 410, the program determines whether the list type, tables type, text type, or graphics type has been found in the primary HTML source file. If the result of this determination is "No," then control is transferred to step 200 in FIG. 2 and the frame check is performed. If the result of this determination is "Yes," then control is transferred to step 420 to capture the pertinent source code.

Figure 4B:
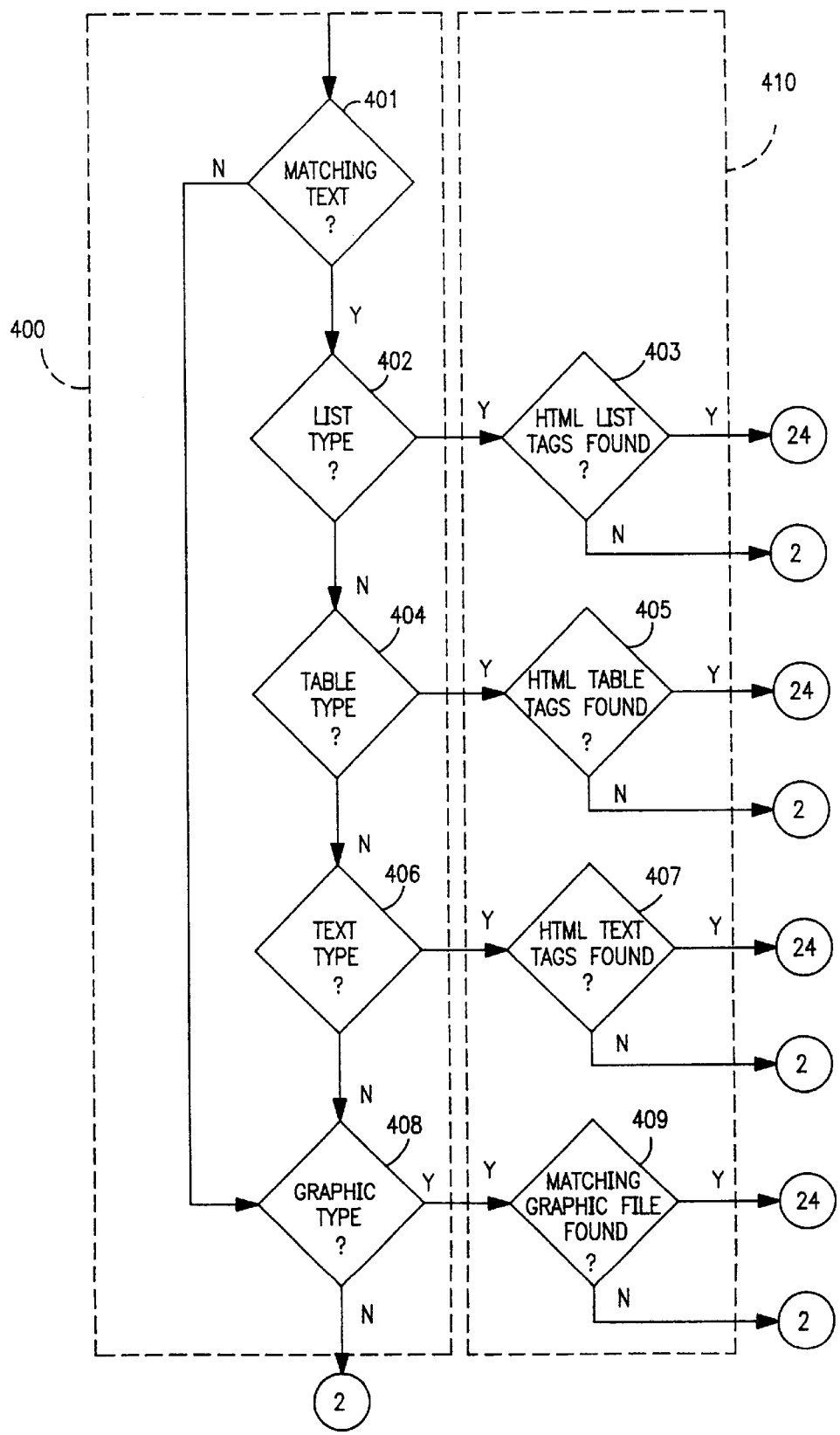
FIG. 4B is a detailed flow chart diagram showing in greater detail the process of steps 400 and 410 shown in FIG. 4A.

FIG. 4B shows a more detailed view of the process of steps 400 and 410. At step 401, the primary HTML source file is searched for a match of the text that is found in HTML list code. If matching text is found, then control is transferred to steps 402 through 407 for further text type checking. If there is no matching text at all within the primary HTML source file, then control is transferred to step 408 to check for a matching graphic.

At step 402, if the source text type is the "list type," control is transferred to step 403. If, at step 402, the source text type is not the list type, control is instead transferred to step 404. At step 403, the HTML tags in the primary HTML source file are searched for the HTML tags that define the list. If tags are found that define the list in the region, control is transferred to step 420 of FIG. 4A. If no tags are found that define the list in the region, control is transferred to step 200 (FIG. 2).

At step 404, if the source text type is the "table type," control is transferred to step 405. If, at step 404, the source text type is not the table type, control is instead transferred to step 406. At step 405, the HTML tags in the primary HTML source file are searched for the HTML tags that define the table. If tags are found that define the table in the region, control is transferred to step 420 of FIG. 4A. If no tags are found that define the table in the region, control is transferred to step 200 (FIG. 2).

At step 406, if the source text type is the "text type," control is transferred to step 407. If, at step 406, the source text type is not the text type, control is instead transferred to step 408. At step 407, the HTML tags in the primary HTML source file are searched for the HTML tags that match the text format. If tags are found that match the text format in the region, control is transferred to step 420 of FIG. 4A. If no tags are found that match the text format in the region, control is transferred to step 200 (FIG. 2).

At step 408, if the source text type is the graphics type, then control is transferred to step 409. If, at step 408, the source text type is not the graphics type, control is instead transferred to step 200 (FIG. 2). At step 409, the primary HTML source file is searched for reference to one or more graphic files that, when displayed, match any graphic files found in the region. If graphic files are found that match the graphic files in the region, control is transferred to step 420 of FIG. 4A. If no graphic files are found that match the graphic files in the region, control is transferred to step 200 (FIG. 2).

Step 409 may take advantage of the capability of a browser to identify a graphic file (e.g., a GIF, JPG, or BMP type file) from which a graphic is generated, when a pointing device event (e.g. click or double click) occurs while the cursor is positioned over the graphic generated from the graphic file. Further, this function may take advantage of a conventional browser capability to store images in a cache within the local client processor. A table relates a graphic file in the cache to the URL of the page in which the image is displayed.

Referring again to FIG. 4A, at step 420, having found data in the source file that match the information displayed in the region, the text, list tags, table tags, text tags, or graphics information contained in the primary HTML source file is captured.

If the source text type is list type, then the results of the search of the primary HTML source code (including the HTML tags that define the list) are used to build HTML source code that contains just the formatted output of the list type found in the region. If the source text type is table type, then the results of the search of the primary HTML source code (including the HTML tags that define the table) are used to build HTML source code that contains just the formatted output of the table type found in the region. If the source text type is text type, then the results of the search of the primary HTML source code (including the HTML tags that define the text format) are used to build HTML source code that contains just the formatted text found in the region. If the source text type is the graphics type, then the results of the search of the graphics files in the primary HTML source code are used.

At step 430, the list type, tables type, or text type found in the primary HTML source file is formatted (for example, into a set of ASCII characters), and each is compared to the lists, tables, or text found in the selected region. At step 440, the program determines whether the formatted list type, tables type, text type, or graphics type found in the primary HTML source file matches the lists, tables, text, or graphics found in the selected region. If not, control is transferred to step 200 (FIG. 2) for a further iteration of the search loop. If a match is found, then control is transferred to step 450.

At step 450, the program creates the code for the list type, tables type, text type, or graphics type that is to be included in the subfile. At step 460, the code that was created for the list type, tables type, text type, or graphics type is added to the subfile. Then control is transferred to step 200 of FIG. 1.

FIG. 5 is a flow chart diagram of the process for searching the frame data in the HTML source file and any referenced files. At step 500, the frame code is searched for the HTML source code that is used to produce the portion of the display in the selected region. The process reads all of the data that are contained in the selected region and performs a systematic search for the HTML source code in the primary frame source code and in any frame source file to which the primary frame source code points. Depending on the source text type, the process may also perform a separate search for the data (i.e., text) within the selected region. The process also searches the primary frame source for the code used to construct any frames contained within the selected region.

At step 510, the process determines whether list type, tables type, text type, or graphics type data were found in the primary frame source file or a frame source file to which the primary frame source file points. If the result of this determination is "No," then control is transferred to step 200 in FIG. 2 (so that the Javascript check can be performed in the next iteration of the loop of FIG. 2.) If the result of the determination at step 510 is "Yes," then control is transferred to step 520 to capture the pertinent frame source code.

Analogous to the detailed view of steps 400 and 410 in FIG. 4B, steps 500 and 510 include the following sub-steps (which are not shown in a detailed figure, but are understood by one of ordinary skill in the art):

A. If the source text type is the list type, then the process searches the primary frame source file for matches of the lists displayed in the selected region. The process also searches the frame source code, to which the primary frame source points, for the HTML tags that define the list.
B. If the source text type is the tables type, then the process searches the primary frame source file for matches of the tables displayed in the selected region. The process also searches the frame source code, to which the primary frame source points, for the HTML tags that define the tables.
C. If the source text type is the text type, then the process searches the primary frame source file for matches of the text displayed in the selected region. The process also searches the frame source code, to which the primary frame source points, for the HTML tags that define the text.
D. If the source text type is the graphics type, then the process searches the primary frame source file (and the frame source code to which the primary frame source points) for the graphics files that, when displayed, match any graphics files found in the selected region.

At step 520, the program captures the list type, tables type, text type, or graphics type code found in either the primary frame source file or the frame source file to which the primary frame source points. Step 520 includes the following sub-steps:
A. If the source text type is list type, then the process receives the results of the search of the primary HTML frame source, or the frame source file to which the primary frame source points, including the HTML tags that define the list type. The process then builds the HTML source code that contains just the formatted output of the list type found in the selected region.
B. If the source text type is table type, then the process receives the results of the search of the primary HTML frame source, or the frame source file to which the primary frame source points, including the HTML tags that define the tables type. The process then builds the HTML source code that contains just the formatted output of the tables type found in the selected region.
C. If the source text type is text type, then the process receives the results of the search of the primary HTML frame source, or the frame source file to which the primary frame source points, including the HTML tags that define the text type. The process then builds the HTML source code that contains just the formatted output of the text type found in the selected region.
D. If the source type is the graphics type, then the process receives the results of the search of the primary HTML source code or the frame source file to which the primary frame source points. The process then includes the graphics files which, when formatted, are found in the selected region.
E. The process also receives the results of the search of the primary frame source, or the frame source file to which the primary frame source points, for the code used to construct any frames contained within the selected region. The process then builds the HTML source code that contains just the formatted output of the frames found in the selected region.

At step 530, the list type, tables type, frames, or text type found in the primary frame source file (or in a further frame source file to which the primary frame source points) is compared to the list, tables, or text found in the selected region. At step 540, the result of the comparison is checked. If the list type, tables type, frames, text type, or graphics type found in the primary frame source file (or the frame source file to which the primary frame source points) matches the lists, tables, text, or graphics found in the selected region, the result of the determination at step 540 is "Yes," and step 550 is executed. If the result of the determination is "No," then control is transferred to step 200 of FIG. 2.

At step 550, the code for the list type, tables type, frames, text type, or graphics type is built, to be included in the subfile that is created for viewing in step 170 of FIG. 1. At step 560, the code built in step 550 (for the list type, tables type, frames, text type, or graphics type) is added to the subfile for viewing in step 170 of FIG. 1. Then, control is transferred to step 200 of FIG. 2, so that the next iteration of the loop of FIG. 2 is performed for the Javascript check.

Figure 6:
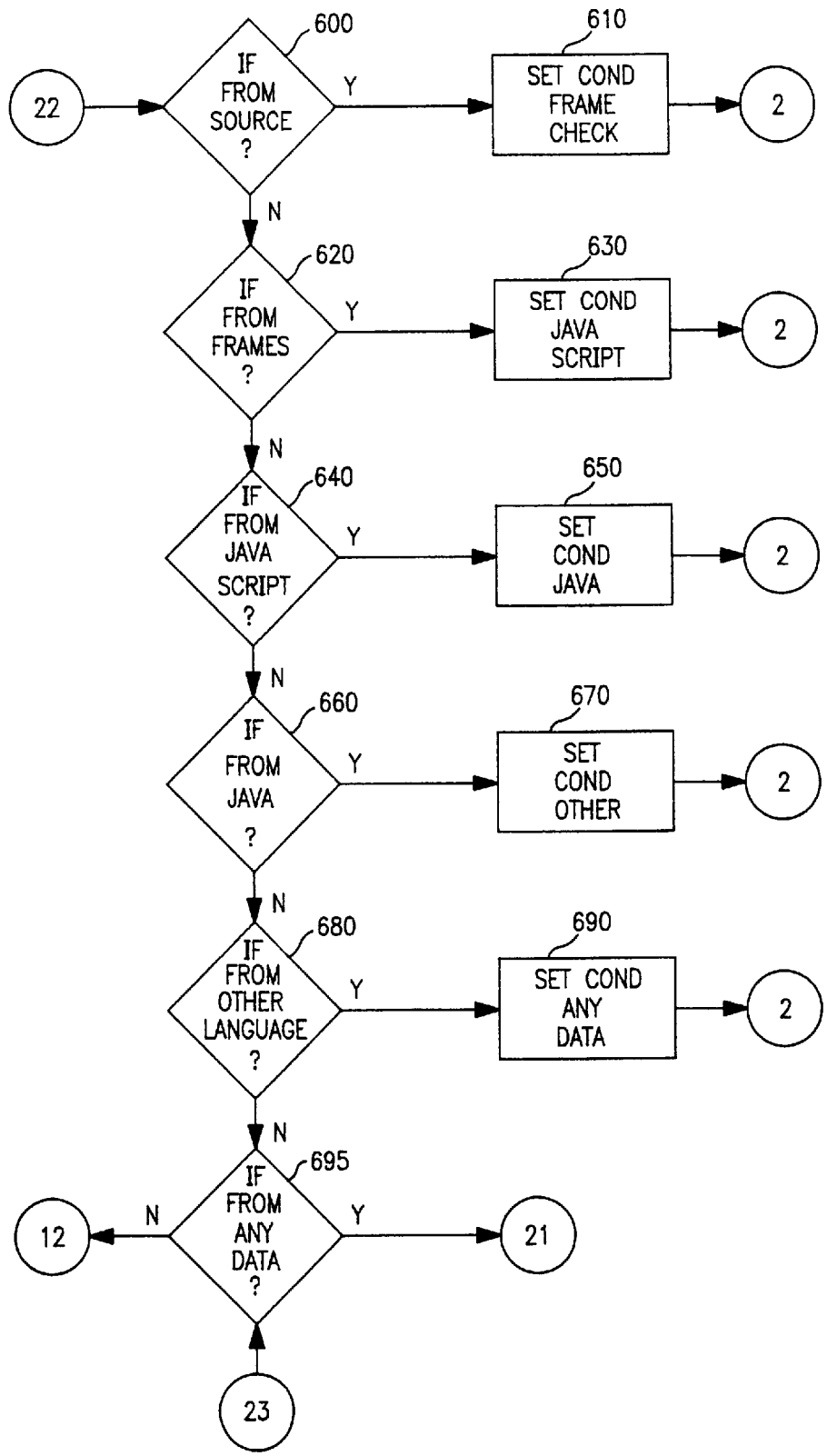
FIG. 6 is a flow chart diagram of the process for setting the pertinent condition codes associated with the origin of the code that generates the selected region of the display.

FIG. 6 is a flow chart diagram of the process for setting the pertinent condition codes associated with the origin of the code that generates the selected region of the display. The steps of FIG. 6 are executed after completion of all of the text checks launched in FIG. 2. Each time the functions of FIG. 6 are executed and control is passed back to step 200 of FIG. 2, the entire loop of FIG. 2 is repeated for a respectively different data source (i.e., source, frames, Javascript, Java, or "other language").

At step 600, the process determines whether the information displayed in the region is generated by logic in the source routine. If the result of this determination is "Yes," which occurs the first time step 600 is executed, then step 610 is executed. If the result is "No," which occurs the second and subsequent times that step 600 is executed, then step 620 is executed.

At step 610, the program sets the condition code that points to frame check, indicating that the match is found by the frame check process. Control is then transferred to step 200 of FIG. 2. At step 620, the process determines whether the information displayed in the region is generated by logic in the frames routine. If the result of this determination is "Yes," which occurs the first time step 620 is executed, then step 630 is executed. If the result is "No," which occurs the second and subsequent times that step 620 is executed, then step 640 is executed.

At step 630, the program sets the condition code that points to Javascript check, indicating that the match is found by the Javascript check process. Control is then transferred to step 200 of FIG. 2. At step 640, the process determines whether the information displayed in the region is generated by logic in the Javascript routine. If the result of this determination is "Yes," which occurs the first time step 640 is executed, then step 650 is executed. If the result is "No," which occurs the second and subsequent times that step 640 is executed, then step 660 is executed.

At step 650, the program sets the condition code that points to Java check, indicating that the match is found by the Java check process. Control is then transferred to step 200 of FIG. 2. At step 660, the process determines whether the information displayed in the region is generated by logic in the Java routine. If the result of this determination is "Yes," which occurs the first time step 660 is executed, then step 670 is executed. If the result is "No," which occurs the second and subsequent times that step 660 is executed, then step 680 is executed.

At step 670, the program sets the condition code that points to the "other language" check, indicating that the match is found by the "other language" check process. Control is then transferred to step 200 of FIG. 2. At step 680, the process determines whether the information displayed in the region is generated by logic in another language routine.

If the result of this determination is "Yes," which occurs the first time step 680 is executed, then step 690 is executed. If the result is "No," which occurs the second and subsequent times that step 680 is executed, then step 695 is executed.

At step 690, the program sets the condition code that points to "any data," indicating that all of the determinations of FIG. 6 (at steps 600, 620, 640, 660, and 680) have been performed. Control is then transferred to step 200 of FIG. 2. At step 695, the program determines whether any data have been collected while checking the code found in the selected region. If the result of this determination is "Yes," then control is transferred to step 170 of FIG. 1, to display the information contained in the subfile. If the result of this determination is "No," then control is transferred to step 180 of FIG. 1, to prompt the user to either select another region or exit the program.

FIG. 7 is a flow chart diagram of the process for searching the source file for Javascript source code. At step 700, the program searches for Javascript source code used to generate the list, tables, text, or graphics contained in the selected region. This step includes searching for the Javascript code found in the primary HTML source file. The process reads all of the text and graphics contained in the selected region and performs a systematic search of the primary HTML source file for the Javascript code. Depending on the source text type, the process performs a different type of search in the Javascript source.

At step 710, the program determines whether the Javascript code that generates the list, tables, text, or graphics is found in the primary Java source file. If the result of this determination is "Yes," step 720 is executed. If the result of this determination is "No," then control is transferred to step 200 of FIG. 2.

Analogous to the detailed view of steps 400 and 410 in FIG. 4B, steps 700 and 710 include the following sub-steps (which are not shown in a detailed figure, but are understood by one of ordinary skill in the art):

A. If the source text type is the list type, then the process searches the primary HTML source file for code that generates information that matches the lists displayed in the selected region.

B. If the source text type is the tables type, then the process searches the primary HTML source file for code that generates information that matches the tables displayed in the selected region.

C. If the source text type is the text type, then the process searches the primary HTML source file for code that generates information that matches the text displayed in the selected region.

D. If the source text type is the graphics type, then the process searches the primary HTML source file for code that generates information that matches the graphics displayed in the selected region.

At step 720, the process captures the Javascript code in the primary HTML source file that generates the list, tables, text, or graphics found in the selected region. At step 730, the formatted output of the Javascript code captured in step 720 is compared to the lists, tables, or text found in the selected region.

At step 740, a determination is made as to whether the Javascript code for the lists, tables, text, or graphics within the primary HTML file generates information that matches the information displayed in the selected region. If the result of the determination is "Yes," step 750 is executed. If the result of the determination is "No," then control is transferred to step 200 of FIG. 2. At step 750, the Javascript code captured in step 720 is added to the subfile. Control is then transferred to step 200 of FIG. 2.

FIG. 8 is a flow chart diagram of the process for searching files in the server (other than the primary source file that generates the web page) for Java source code used to generate the information in the selected region. At step 800, the process searches for (a file other than the primary HTML source file, containing) Java source code that generates the lists, tables, text, or graphics type found within the selected region. Step 800 includes searching the Java code files on the fileserver. This includes fetching and analyzing the code for any other Java source code files that are referenced.

At step 805, a determination is made as to whether Java code has been located which generates the information in the selected region. If the result of this determination is "Yes," then step 810 is executed. If the result of this determination is "No," then control is transferred to step 200 of FIG. 2. At step 810, the process attempts to capture the found Java code.

At step 815, a determination is made as to whether the Java code can be transmitted from the fileserver. In some instances, the referenced Java code files may not be available, for example, because some Java code contains proprietary information and may have access restrictions. If the result of this determination is "Yes," then step 825 is executed. If the result of this determination is "No," then step 820 is executed.

At step 820, when the desired Java code is not available, the program writes a message in the subfile indicating that the Java code for the selected region or section of the selected region cannot be found. At step 825, the Java source code that is used to produce the lists, tables, text, or graphics found in the selected region is read. Then, at step 830, the program compares the output of the Java code (that produces lists, tables, or text type) found in the primary Java source file (and other Java source code files to which the primary Java source points) to the lists, tables, or text within the selected region.

Analogous to the detailed view of steps 400 and 410 in FIG. 4B, step 830 includes the following sub-steps (which are not shown in a detailed figure, but are understood by one of ordinary skill in the art):

A. If the source text type is the list type, then the process captures from the primary Java source file, and other Java source code files to which the primary Java source points, the code that builds the list displayed in the selected region.

B. If the source text type is the tables type, then the process captures from the primary Java source file, and other Java source code files to which the primary Java source points, the code that builds the tables that are displayed in the selected region.

C. If the source text type is text, then the process captures from the primary Java source file, and other Java source code files to which the primary Java source points, the code that builds the text displayed in the selected region.

D. If the source text type is the graphics type, then the process captures from the primary Java source file, and other Java source code files to which the primary Java source points, the code that produces the graphics displayed in the selected region.

At step 835, a determination is made as to whether the Java code that builds the lists, tables, text, or graphics found in the primary Java source file (and other Java source code files to which the primary Java source points) generates the lists, tables, text, or graphics displayed in the selected region. If the result of this determination is "Yes," then step 840 is executed. If the result of this determination is "No," then step 200 of FIG. 2 is executed. At step 840, the code that was found in the Java source file in step 805 is added to the subfile. Control is then transferred to step 200 of FIG. 2.

FIG. 9 is a flow chart diagram of the process for searching a language library in the server for language routines that are used to decode the source code which generates the selected region of the display. At step 900, the "other language" library in the fileserver is searched for a list of languages (other than HTML or Java) in which the code that generates the information displayed in the selected region may be written.

At step 905, a determination is made as to whether one or more languages were found in the "other language" library. If the result of this determination is "Yes," then step 910 is executed. If the result of this determination is "No," then control is transferred to step 695 of FIG. 6. At step 910, the "other language" library is searched for another language that generates the information displayed in the selected region. Both the primary HTML source file and the pointers in the primary HTML source file are checked.

At step 915, a determination is made as to whether another language is found. If the result of this determination is "Yes," then step 920 is executed. If the result of this determination is "No," then control is transferred to step 200 of FIG. 2. At step 920, the process attempts to capture the "other language" routines that are used to generate the information in the selected region.

At step 925, a determination is made as to whether the "other language" code can be captured. In some instances, the referenced "other language" code files may not be available, for example, because some "other language" code contains proprietary information and may have access restrictions. If the result of this determination is "Yes," then the code is captured and step 935 is executed. If the result of this determination is "No," then step 930 is executed.

At step 930, a message is added to the subfile indicating that the "other language" routines are not available. At step 935, the process reads the "other language" source code and searches for the code that generates the lists, tables, text, or graphics found in the selected region. At step 940, the output of the code that generates the lists, tables, text, or graphics is compared to the lists, tables, text, or graphics found in the selected region.

At step 945, a determination is made as to whether the "other language" code generates an output that matches the information displayed in the selected region. If the result of this determination is "Yes," then step 950 is executed. If the result of this determination is "No," then step 200 of FIG. 2 is executed. At step 950, the "other language" code that generates an output that matches the information displayed in the selected region is added to the subfile. Then control is transferred to step 200 of FIG. 2.

One of ordinary skill in the art recognizes that the invention may be applied using a variety of browsers and source code languages. For example, although the exemplary embodiment includes HTML source files, it is contemplated that the invention may also be applied to source files using extensible markup language (XML). The invention may be practiced via enhancements to conventional browsers such as Navigator™ by the Netscape Corporation, or Internet Explorer™ by the Microsoft Corporation of Redmond Wash.

Although the invention may be practiced advantageously in a client server configuration in which the client and server processors are coupled via the Internet, and the server processor hosts the web site for the web page that is examined, the invention may also be practiced in many other configurations. For example, the client and server processor may be two processors within a local area network. In a further example, it is not necessary for the processors to use the client server model; the browser may be used to view files stored in a local device (such as a disk), and the invention may be used to find a portion of the locally stored file that generates the portion of the displayed information within a selected region. These examples are non-exclusive, and other hardware configurations are also contemplated.

Further, the invention may be embodied in various methods and apparatus for practicing the method. The invention may also be embodied in the form of program code embodied in tangible media, such as random-access memory (RAM), read-only memory (ROM), floppy diskettes, CD-ROMs, hard disk drives, zip drives, or any other machine-readable storage medium, wherein, when the program code is loaded into and executed by a machine, such as a computer, the computer becomes an apparatus for practicing the invention. The invention may also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method for separating a source file sent by a server in a network into subfiles, comprising the steps of:
   (a) processing the source file to generate an output display;
   (b) selecting a region within the output display, the region including less than the whole output display and containing an arbitrary area of the output display;
   (c) identifying information that is displayed within the region;
   (d) identifying a portion of the source file from which the information displayed within the region is generated, the portion representing one subfile of the source file;
   (e) obtaining code for the one subfile; and
   (f) outputting the code.

2. The method according to claim 1, wherein the source file is a hypertext markup language source file and the portion of the source file includes hypertext markup language tags.

3. The method according to claim 2, wherein the information includes at least one of text, a list, and a table.

4. The method according to claim 2, wherein the information includes a list containing text and step (d) includes:
   (d1) searching for any text within the source file which matches the text within the region, and
   (d2) if a subset of the text within the source file matches the text within the region, determining whether the hypertext markup language tags in the source file, which are associated with the text in the subset, are hypertext markup language tags for defining a list.

5. The method according to claim 2, wherein the information includes a table containing text and step (d) includes:

(d1) searching for any text within the source file which matches the text within the region, and (d2) if a subset of the text within the source file matches the text within the region, determining whether the hypertext markup language tags in the source file, which are associated with the text in the subset, are hypertext markup language tags for defining a table.

6. The method according to claim 1, wherein step (a) includes the step of viewing the source file via a web browser.

7. The method according to claim 1, wherein the information includes a graphic.

8. The method according to claim 1, wherein steps (a) through (e) are performed by a client processor and the source file is stored in a server processor separate and distinct from the client processor.

9. The method according to claim 8, wherein the client processor and the server processor are connected via a communications network.

10. The method according to claim 1, wherein the source file contains one of source and object code of a software program and step (d) includes the steps of:

(da) determining an output of the software program, and (db) identifying one of the source and object code of the software program as the portion of the source file if the output of the software program matches the information displayed within the region.

11. The method according to claim 10, wherein the source file contains Java code.

12. The method according to claim 1, wherein the source file references a further file containing one of source and object code of a software program; step (d) includes the steps of (1) determining an output of the software program, and (2) determining whether the output of the software program matches the information displayed within the region; and the method further includes the step of (f) listing one of the source and object code of the software program if the output of the software program matches the information displayed within the region.

13. The method according to claim 12, wherein steps (a) through (e) are performed by a client processor, and the further file is stored in a server processor separate and distinct from the client processor.

14. The method according to claim 13, wherein the server processor includes a language library, and step (1) includes the step of using the language library to determine the output of the software program.

15. The method according to claim 12, wherein the further file contains Java code.

16. A system for separating a source file sent by a server in a network into subfiles, the system comprising:

means for processing the source file to generate an output display;

means for selecting a region within the output display, the region including less than the whole output display and containing an arbitrary area of the output display;

means for identifying information that is displayed within the region;

means for identifying a portion of the source file from which the information displayed within the region is generated, the portion representing one subfile of the source file;

means for obtaining code for the one subfile; and means for outputting the code.

17. A computer-readable medium for use in a computer system having a display, the computer readable medium encoded with a computer program for separating a source file sent by a server in a network into subfiles, the computer readable medium comprising:

(a) means for causing the computer to process the source file to generate an output display;

(b) means for causing the computer to receive an identification of a region within the output display, the region including less than the whole output display and containing an arbitrary area of the output display;

(c) means for causing the computer to identify information that is displayed within the region;

(d) means for causing the computer to identify a portion of the source file from which the information displayed within the region is generated, the portion representing one subfile of the source file;

(e) means for causing the computer to obtain code for the one subfile; and (f) means for causing the computer to output the code.

* * * * *